UNITED STATES PATENT OFFICE 2,153,018

DISAZO DYESTUFFS INSOLUBLE IN WATER AND FIBER DYED THEREWITH

Hans Heyna and Paul Jörg, Frankfort-on-the-Main-Hochst, Germany, assignors to General Aniline Works, Inc., New York, N. Y., a corporation of Delaware No Drawing. Application October 26, 1937, Serial No. 171,072. In Germany October 27, 1936

8 Claims. (Cl. 260—188)

The present invention relates to disazo dyestuffs insoluble in water and to fiber dyed therewith; more particularly, it relates to dyestuffs of the following general formula:

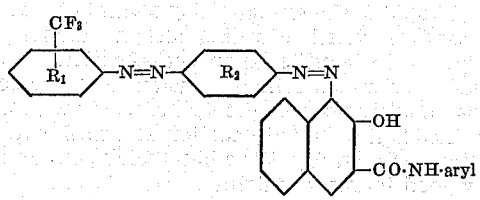

wherein $R_1$ may be further substituted by trifluoromethyl, nitro-groups and/or halogen, $R_2$ by alkyl and/or alkoxy groups.

We have found that valuable disazo-dyestuffs insoluble in water are obtainable by diazotising an amino-azo compound of the general constitution:

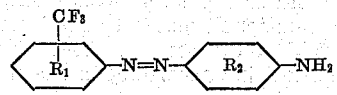

wherein $R_1$ may be further substituted by trifluoromethyl, nitro-groups and/or halogen, $R_2$ by alkyl and/or alkoxy groups, and coupling the diazo compound with an arylide of 2-hydroxynaphthalene-3-carboxylic acid in substance, on the fiber or in a substratum adapted for the production of lakes. The hitherto unknown amino-azo compounds are obtainable by coupling a diazotised aminobenzotrifluoride with an amino compound of the benzene series unsubstituted in para-position to the amino-group.

The new dyestuffs have good general fastness and constitute a valuable advance in the art. With regard to their fastness to light they are superior to the known water-insoluble disazo dyestuffs obtainable by coupling diazotised 2-amino-1.1'-azobenzenes containing a trifluoromethyl group in the benzene nucleus not carrying the amino group with 2-hydroxynaphthalene-3-carboxylic acid arylides.

The following examples serve to illustrate the invention, but they are not intended to limit it thereto:

(1) For the production of the dyeings 50 grams of cotton yarn are treated for half an hour in the grounding solution, squeezed and developed for half an hour in the diazo solution. The material is then rinsed, soaped at boiling temperature, rinsed again and dried.

(a) Grounding solution 5 grams of 2.3-hydroxynaphthoylaminobenzene are dissolved in a mixture of 10 cc. of alcohol, 2.5 cc. of formaldehyde of 30 per cent. strength, 2.5 cc. of caustic soda solution of 34° Bé. and 10 cc. of water and the solution is introduced into 1 litre of water of 35° C., in which 10 cc. of Turkey red oil of 50 per cent. strength and 12 cc. of caustic soda solution of 34° Bé. have previously been dissolved.

(b) Diazo-solution 4.5 grams of the aminoazo-compound of the formula:

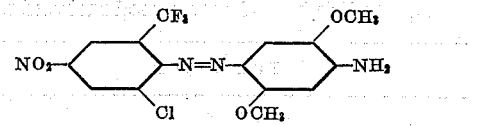

are made into a paste with 5 cc. of formic acid of 90 per cent. strength and mixed, while stirring, with 3.2 cc. of sulphuric acid of 36° Bé. Into this mixture there is run a solution of 0.8 gram of sodium nitrite while cooling with ice. After about 20 minutes the diazotisation is finished. The bath is made up with water to 1 litre and neutralised with 4 grams of crystallised sodium acetate.

A blue-black dyeing of very good fastness to light is obtained. The dyestuff corresponds with the following formula:

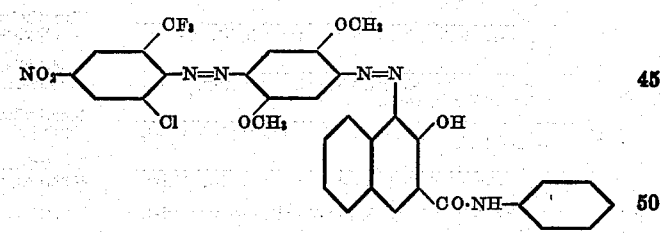

(2) Printing paste 80 grams of dry diazonium salt containing 20 per cent. by weight of the aminoazo-compound of the constitution:

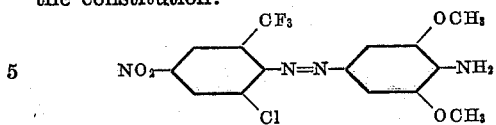

in the form of the zinc chloride double salt of the diazonium chloride, are stirred with water with addition of 90 cc. of acetic acid of 50 per cent. strength and mixed with 400 grams of wheat starch-tragacanth-thickening. The whole is made up to 1 kilo.

*Grounding solution*

15 grams of 1-(2',3'-hydroxynaphthoylamino)-2-methylbenzene, 20 grams of Monopol brilliant oil and 18 cc. of caustic soda solution of 38° Bé. are dissolved with water in the usual manner to make 1 litre.

*Printing prescription*

The material is added with the grounding solution, dried, printed with the printing paste, dried again and then treated with hot dilute sodium carbonate solution. Then it is rinsed, soaped at boiling temperature, rinsed again and dried.

Blue-black prints of very good fastness to light are obtained.

(3) (*a*) *Grounding solution.*—As described in Example 1.

(*b*) *Diazo-solution*

4 grams of the aminoazo-compound of the formula:

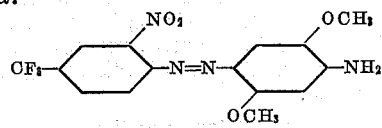

are diazotised as described in Example 1. After developing there is obtained a blue-black dyeing with a reddish hue of a very good fastness to light.

(4) (*a*) *Grounding solution.*—As described in Example 1.

(*b*) *Diazo-solution*

3.7 grams of the aminoazo-compound of the constitution:

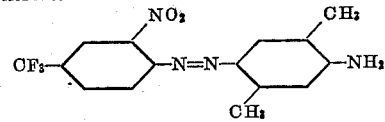

are diazotised as described in Example 1. There is obtained a garnet dyeing of a very good fastness to light.

(5) 4.5 grams of the aminoazo-compound of the constitution:

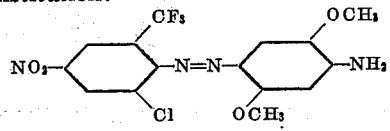

are diazotised with dilute sulphuric acid and sodium nitrite in the usual manner. The filtered diazo-solution is run into a solution of 29.3 grams of 1-(2',3'-hydroxy-naphthoylamino)-2-methoxybenzene, which contains such an amount of caustic soda solution that the reaction of the solution remains alkaline with caustic soda throughout the coupling operation. The dyestuff obtained is filtered with suction and washed until neutral. When dry it is a blue-black powder of a very good fastness to light.

The dyestuff may also be produced on a substratum adapted for the preparation of lakes by adding heavy spar, zinc white or the like to the solution of the 2:3-hydroxy-naphthoic acid arylide, and then running in the diazo-solution.

Dyestuffs of similar properties are obtained by using other arylides of 2-hydroxynaphthalene-3-carboxylic acid or other aminoazo-compounds of the above mentioned general constitution. The following table indicates a number of other azo dyestuffs obtainable according to the present invention.

| | Diazo-component | Coupling component | Shade |
|---|---|---|---|
| 1 | 4-amino-2,5-dimethoxy-2'-chloro-6'-trifluoromethyl- 4'-nitro,1, 1'-azobenzene. | 1-(2',3'-hydroxynaphthoylamino)- 4-methoxybenzene | Black. |
| 2 | do | 4-chlorobenzene | Blue-black. |
| 3 | do | 2-methyl-4-methoxybenzene | Do. |
| 4 | do | Napthalene | Reddish black. |
| 5 | do | 2, 5-dimethoxybenzene | Do. |
| 6 | do | 4-chloro-2, 5-dimethoxybenzene | Blue-black. |
| 7 | do | 2-methoxybenzene | Do. |
| 8 | 4-amino-2, 5-dimethoxy-2'-nitro-4'-trifluoromethyl-1, 1'-azobenzene. | Naphthalene | Reddish black. |
| 9 | do | 4-methoxybenzene | Do. |
| 10 | 4-amino-2, 5-dimethyl-2'-nitro-4'-trifluoromethyl -1, 1'-azobenzene. | 2-methylbenzene | Garnet. |
| 11 | do | 2-methyl-4 methoxybenzene | Do. |
| 12 | do | 2, 5 dimethoxybenzene | Do. |
| 13 | 4-amino-2, 5 diethoxy-3', 5'-bis-trifluoromethyl-1, 1'-azobenzene. | Naphthalene | Black-violet. |
| 14 | do | Benzene | Do. |
| 15 | 4-amino-2, 5-dimethoxy-2'-chloro-5'-trifluoromethyl-1, 1'-azobenzene. | 2-methylbenzene | Do. |
| 16 | do | Naphthalene | Do. |
| 17 | 4-amino-2, 5-dimethoxy-3'-trifluoromethyl-1, 1'- azobenzene. | 2-methyl-4-chlorobenzene | Do. |
| 18 | do | 2-methylbenzene | Do. |
| 19 | 4-amino-2-methoxy-5-methyl-4'-trifluoromethyl -2'-nitro-1, 1'-azobenzene. | Benzene | Do. |
| 20 | do | 2-methylbenzene | Currant. |
| 21 | 4-amino-2, 5-dimethoxy-2'-trifluoromethyl-4'-nitro-1, 1'-azobenzene. | Naphthalene | Blue-black. |
| 22 | do | Benzene | Do. |
| 23 | 4-amino-3-methyl-2'-nitro-4'-trifluoromethyl-1, 1'-azobenzene. | 4-methoxybenzene | Garnet. |
| 24 | 4-amino-2,5-dimethoxy-4'-nitro-5'-trifluoromethyl-1, 1'-azobenzene. | Benzene | Reddish black. |
| 25 | do | Naphthalene | Do. |
| 26 | 4-amino-2, 5-dimethoxy-2'-chloro-6'-nitro-4'-trifluoromethyl-1, 1'-azobenzene. | Benzene | Blue-black. |
| 27 | do | 2-methylbenzene | Do. |
| 28 | do | 4-chlorobenzene | Do. |
| 29 | do | 4-methoxybenzene | Violet black. |

| | | Diazo-component | Coupling component | Shade | |
|---|---|---|---|---|---|
| 5 | 30 | 4-amino-2-methyl-5-methoxy-2'-nitro-4'-trifluoromethyl-1,1'-azobenzene. | 1-(2',3'-hydroxynaphthoylamino)-Benzene | Currant. | 5 |
| | 31 | ____do____ | 2-methyl-4-methoxybenzene | Do. | |
| | 32 | ____do____ | 2-(2',3'-hydroxynaphthoylamino)-naphthalene | Do. | |
| | 33 | ____do____ | 1-(2',3'-hydroxynaphthoylamino)-2,5-dimethoxybenzene | Do. | |
| 10 | 34 | 4-amino-2,5-diethoxy-2'-trifluoromethyl-4'-bromo-1,1'-azobenzene. | Benzene | Reddish blue-black. | 10 |
| | 35 | ____do____ | 2-methoxybenzene | Black violet. | |
| | 36 | 4-amino-2,5-di-(beta-hydroxyethyl-ethoxy)-2'-nitro-6'-chloro-4'-trifluoromethyl-1,1'-azobenzene of the formula: | Benzene | Greenish dark blue. | |
| 15 | | 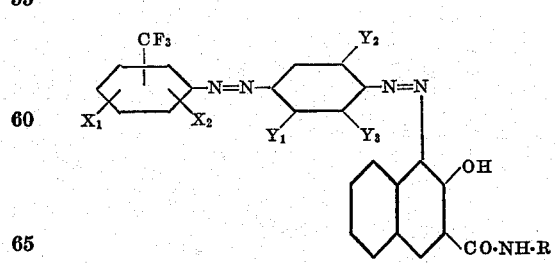 | | | 15 |
| 20 | 37 | 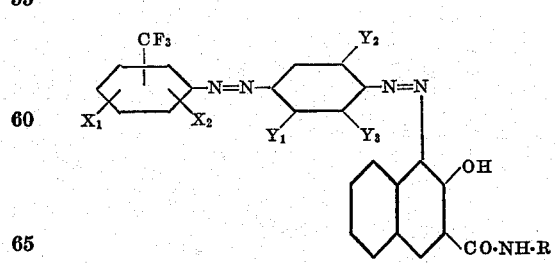 | 2-(2',3'-hydroxynaphthoylamino)-naphthalene | Dark blue. | 20 |
| | 38 | 4-amino-2,5-diethoxy-3'-trifluoromethyl-1,1'-azobenzene. | 1-(2',3'-hydroxynaphthoylamino)-Benzene | Blue black. | |
| 25 | 39 | ____do____ | 2-methylbenzene | Do. | 25 |
| | 40 | 4-amino-2,5-dimethoxy-2',4'dinitro-5'-trifluoromethyl-1,1'-azobenzene. | Benzene | Dark blue. | |
| | 41 | ____do____ | 4-methoxybenzene | Do. | |
| | 42 | 4-amino-2,5-dimethoxy-2',5'-bis-trifluoromethyl-4'-nitro-1,1'-azobenzene. | Benzene | Black violet. | |
| | 43 | ____do____ | 2-methoxybenzene | Do. | |
| 30 | 44 | ____do____ | 2-(2',3'-hydroxynaphthoylamino)-naphthalene | Violet black. | 30 |
| | 45 | 4-amino-2,5-dimethoxy-4',5'-dichloro-2'-trifluoromethyl-1,1'-azobenzene. | 1-(2',3'-hydroxynaphthoylamino)-Benzene | Black violet. | |
| | 46 | 4-amino-2-methyl-2'-nitro-4'-trifluoromethyl-1,1'-azobenzene. | Benzene | Garnet. | |
| | 47 | ____do____ | 4-methoxybenzene | Do. | |
| 35 | 48 | ____do____ | 2-(2',3'-hydroxynaphthoylamino)-naphthalene | Do. | 35 |
| | 49 | 4-amino-2-methoxy-2'-nitro-4'-trifluoromethyl-1,1'-azobenzene. | 1-(2',3'-hydroxynaphthoylamino)-Benzene | Currant. | |
| | 50 | ____do____ | 2-methoxybenzene | Garnet. | |
| | 51 | ____do____ | 4-methoxybenzene | Currant. | |
| | 52 | 4-amino-2'-nitro-4'-trifluoromethyl-1,1'-azobenzene | Benzene | Garnet. | |

Since an object of the present invention is to provide dyestuffs of good fastness properties which dyestuffs are insoluble in water and alkalies, it is to be understood that the aromatic nuclei of the general formulae appearing in the appended claims do not contain any substituents which are known to render organic compounds soluble in water or alkalies and to tend to depreciate the fastness of the dyestuffs to alkalies. Substituents of this kind are, for instance, the sulphonic and the carboxylic acid group.

We claim:

1. The water-insoluble disazo dyestuffs of the following general formula:

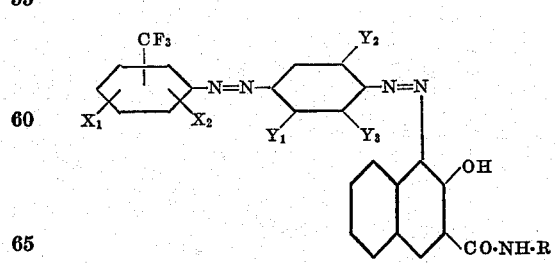

wherein $X_1$ and $X_2$ stand for members of the group consisting of hydrogen, halogen, nitro and trifluoromethyl, $Y_1$ and $Y_2$ for members of the group consisting of hydrogen, methyl and alkoxy, $Y_3$ stands for one of the group consisting of hydrogen, and methyl, and R means a member of the group consisting of radicals of the benzene and naphthalene series, yielding, when produced on the fiber, garnet, currant, blue and black shades of good fastness properties.

2. The water-insoluble disazo dyestuff of the following formula:

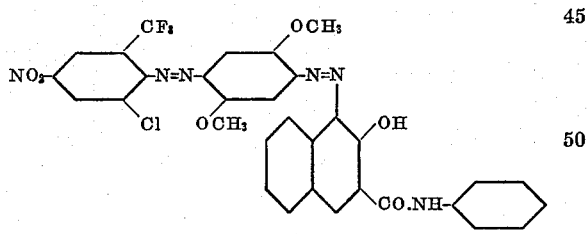

yielding, when produced on the fiber, blue-black shades of good fastness properties, particularly of very good fastness to light.

3. The water-insoluble disazo dyestuff of the following formula:

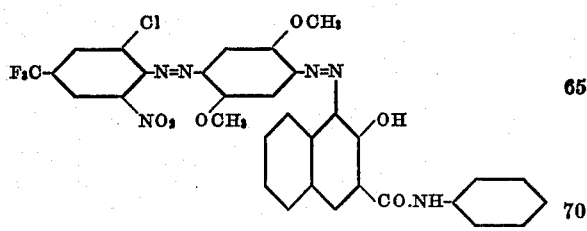

yielding, when produced on the fiber, blue-black shades of good fastness properties, particularly of very good fastness to light.

4. The water-insoluble disazo dyestuff of the following formula:

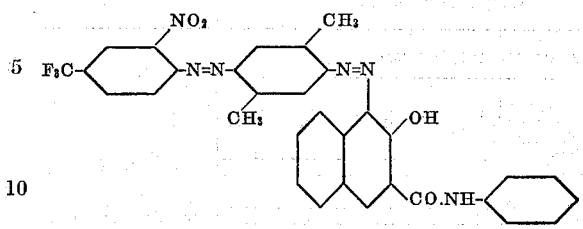

yielding, when produced on the fiber, garnet shades of good fastness properties, particularly of very good fastness to light.

5. Fiber dyed with the dyestuffs as claimed in claim 1.

6. Fiber dyed with the dyestuff as claimed in claim 2.

7. Fiber dyed with the dyestuff as claimed in claim 3.

8. Fiber dyed with the dyestuff as claimed in claim 4.

HANS HEYNA.
PAUL JÖRG.